US012597736B2

(12) United States Patent
Hong et al.

(10) Patent No.: US 12,597,736 B2

(45) Date of Patent: Apr. 7, 2026

(54) ELECTRICAL CONNECTOR AND ELECTRICAL CONNECTOR ASSEMBLY HAVING THE SAME

(71) Applicant: Molex, LLC, Lisle, IL (US)

(72) Inventors: Sa Cheol Hong, Uiwang-si (KR); Jong Deok Park, Siheung-si (KR); Jang Bum Jin, Incheon (KR)

(73) Assignee: Molex, LLC, Lisle, IL (US)

( * ) Notice: Subject to any disclaimer, the term of this patent is extended or adjusted under 35 U.S.C. 154(b) by 305 days.

(21) Appl. No.: 18/382,065

(22) Filed: Oct. 20, 2023

(65) Prior Publication Data

US 2024/0136763 A1 Apr. 25, 2024

US 2024/0235112 A9 Jul. 11, 2024

(30) Foreign Application Priority Data

Oct. 25, 2022 (KR) ........................ 10-2022-0138195

(51) Int. Cl.
*H01R 13/627* (2006.01)

(52) U.S. Cl.
CPC ................................ *H01R 13/6273* (2013.01)

(58) Field of Classification Search
CPC .................................................. H01R 13/6273
USPC ......................................... 439/352, 357, 358
See application file for complete search history.

(56) References Cited

U.S. PATENT DOCUMENTS 3,569,909 A * 3/1971 Garver ............... H01R 13/6273 439/353
5,203,719 A * 4/1993 Kozono ............. H01R 13/6272 439/357
5,234,356 A * 8/1993 Maejima ............ H01R 13/6272 439/352
5,387,110 A * 2/1995 Kantner ................. H01R 29/00 439/325
5,683,264 A * 11/1997 Hobgood ............. H01R 13/641 439/352
5,876,232 A * 3/1999 Matsushita ........ H01R 13/6272 439/357
6,341,972 B1 * 1/2002 Odorfer ............. H01R 13/6273 439/352
7,025,618 B2 * 4/2006 Fukuda .............. H01R 13/6271 439/353
7,037,129 B2 * 5/2006 Lo ........................ H01R 13/562 439/352

(Continued)

FOREIGN PATENT DOCUMENTS

JP S49102290 U 9/1974
JP 2580357 B2 2/1997
JP 2019061953 A 4/2019

*Primary Examiner* — Gary F Paumen

(57) ABSTRACT

A plug connector according to an embodiment of the present disclosure, wherein the housing of the plug connector includes a mating portion extending forward and a latching portion equipped in the housing. The latching portion may include, as a root having a lower end connected to the upper surface of the housing, a root extending to the upper end with the lower end of the root as a first fulcrum to form a cantilever structure; and as a pair of latching arms having a rear end connected to an upper end of the root, a pair of latching arms extending to the front end with the upper end of the root as a second fulcrum to form a pair of hooks. Each front end of the pair of latching arms may include an outward protrusion.

18 Claims, 15 Drawing Sheets

(56) References Cited

U.S. PATENT DOCUMENTS

| | | | | |
|---|---|---|---|---|
| 7,467,965 | B1 * | 12/2008 | Arai | H01R 13/6273 439/353 |
| 8,647,140 | B2 * | 2/2014 | Annecke | H01R 13/6273 439/352 |
| 9,608,373 | B2 | 3/2017 | Wu et al. | |
| 2002/0022394 | A1 * | 2/2002 | Fukuda | H01R 13/6271 439/357 |
| 2004/0005806 | A1 * | 1/2004 | Annecke | H01R 13/633 439/358 |
| 2006/0134964 | A1 * | 6/2006 | Ohtaka | H01R 13/6273 439/358 |

* cited by examiner

II − II'

ELECTRICAL CONNECTOR AND ELECTRICAL CONNECTOR ASSEMBLY HAVING THE SAME

RELATED APPLICATION

The present application claims priority to Korean Patent Application No. 10-2022-0138195 filed on Oct. 25, 2022, which is incorporated by reference in its entirety.

TECHNICAL FIELD

This disclosure relates to the field of electrical connectors, and more particularly to electrical connectors and electrical connector assemblies having electrical connectors.

BACKGROUND

Electrical connector assemblies are used in a variety of industrial applications and typically include a plug connector and a mating receptacle connector. In order to ensure a stable electrical connection, the electrical connector includes a latching portion (fastening lever or fastening structure) that additionally provides a predetermined physical connection in addition to the connector mating portion.

The plug connector and the receptacle connector can be firmly fastened to each other by a locking mechanism in the latching portion. For example, electrical connectors can be joined together in a snap-fit manner. The latching portion of the plug connector may include a cantilever and a hook formed at an end of the cantilever, and the mating receptacle connector may include a stopper on which the hook is caught. The hook of the plug connector is caught by the stopper of the receptacle connectors, so that the connectors can be fastened to each other.

The locking mechanism of the latching portion can be implemented in various ways. The locking mechanism is required to provide high locking strength so that the two connectors are not easily separated from each other after they are fastened. Meanwhile, for user convenience and workability, it is advantageous for the insertion force required when connecting two connectors to each other and the release force required to separate the connectors from each other to be low. Therefore, the locking mechanism provides high locking strength in the locked state to prevent unintentional release; in addition, it is desirable to require low insertion force and low release force during insertion and release, so that users can easily insert and release the device. However, while the locking mechanism requires low insertion or release force during insertion or release, it is difficult to provide high locking strength after fastening.

Prior Art Literature 0001: Registered U.S. Pat. No. 9,608,373 B2.

SUMMARY

Embodiments of the present disclosure solve the technical problems of the conventional locking structure described above. That is, the purpose of the embodiments of the present disclosure is to provide a locking mechanism between connectors that has high locking strength and low insertion force or low release force.

A plug connector according to an embodiment of the present disclosure, wherein the housing of the plug connector includes a mating portion extending forward and a latching portion equipped in the housing. The latching portion may include, as a root having a lower end connected to the upper surface of the housing, a root extending to the upper end with the lower end of the root as a first fulcrum to form a cantilever structure; and as a pair of latching arms having a rear end connected to an upper end of the root, a pair of latching arms extending to the front end with the upper end of the root as a second fulcrum to form a pair of hooks. Each front end of the pair of latching arms may include an outward protrusion.

A first gap may be provided between an upper surface of the housing and a lower surface of the pair of latching arms, and the latching portion may further include an unlocking lever, the unlocking lever being an actuating protrusion provided on the upper surface of the latching arm.

The unlocking lever may be a force applying elastic arm, a second gap may be provided between the unlocking lever and the pair of latching arms, a rear end of the unlocking lever may be connected to a rear end of the latching arm, and the front end of the unlocking lever may have a protrusion protruding toward the pair of latching arms.

The latching portion may further include a pair of side barriers, and the pair of side barriers may be located on either side of the pair of latching arms and arranged to obscure at least a portion of the space between the latching arms and the upper surface of the housing.

A receptacle connector according to an embodiment of the present disclosure, wherein the housing of the plug connector includes a mating portion extending forward and a receiving portion equipped in the housing. The receiving portion may include a pair of limiting blocks equipped at the front end of the receiving portion, and a central block extending longitudinally from the rear end of the receiving portion and extending between the pair of limiting blocks; and a third gap may be provided between the central block and the pair of limiting blocks, respectively.

The receiving portion may include a seating surface between a front end of the receiving portion and a pair of limiting blocks, the central block may include an inclined surface at its front end, and the inclined surface may gradually rise from the seating surface toward the rear end of the receiving portion.

The rear end of the pair of limiting blocks may be located between the front end of the inclined surface and the rear end of the inclined surface.

Each of the pair of limiting blocks may include a limiting surface at a rear end of the limiting blocks that contacts the outer protrusions of the pair of latching arms when engaged, and the limiting surface may be inclined with respect to the inner surface of the limiting block.

An electrical connector assembly according to an embodiment of the present disclosure may include the plug connector and the mating receptacle connector.

As the latching portion is received into the receiving portion for mating the plug connector with the receptacle connector, the pair of latching arms may be bent between the pair of limiting blocks, and the front end of the pair of latching arms may be slidably moved along the inclined surface.

When the plug connector mates with the receptacle connector, the pair of latching arms may be positioned in the third gap between the central block and the pair of limiting blocks.

The inclined surface may have a width greater than the gap between the front ends of the pair of latching arms when the pair of latching arms are bent by the pair of limiting blocks.

At the time the plug connector is mated with the receptacle connector, when the pair of hooks contacts the pair of limiting blocks, the front end of the pair of latching arms may contact the inclined surface.

At the time the plug connector is mated with the receptacle connector, the pair of hooks may be bent to approach each other as the pair of latching arms contact the pair of limiting blocks.

At the time the plug connector is mated with the receptacle connector, the pair of hooks may be bent to approach each other and simultaneously bent downward along the inclined surface in the height direction of the inclined surface.

At the time the plug connector is mated with the receptacle connector, when the pair of latching arms are fastened to the pair of limiting blocks, the pair of hooks may contact the limiting surface.

According to embodiments of the present disclosure, a connector assembly can have low insertion force or low release force while having high locking strength. Accordingly, while implementing highly reliable coupling between connectors, the user is able to assemble or disassemble the connectors.

DETAILED DESCRIPTION

Figure 1:
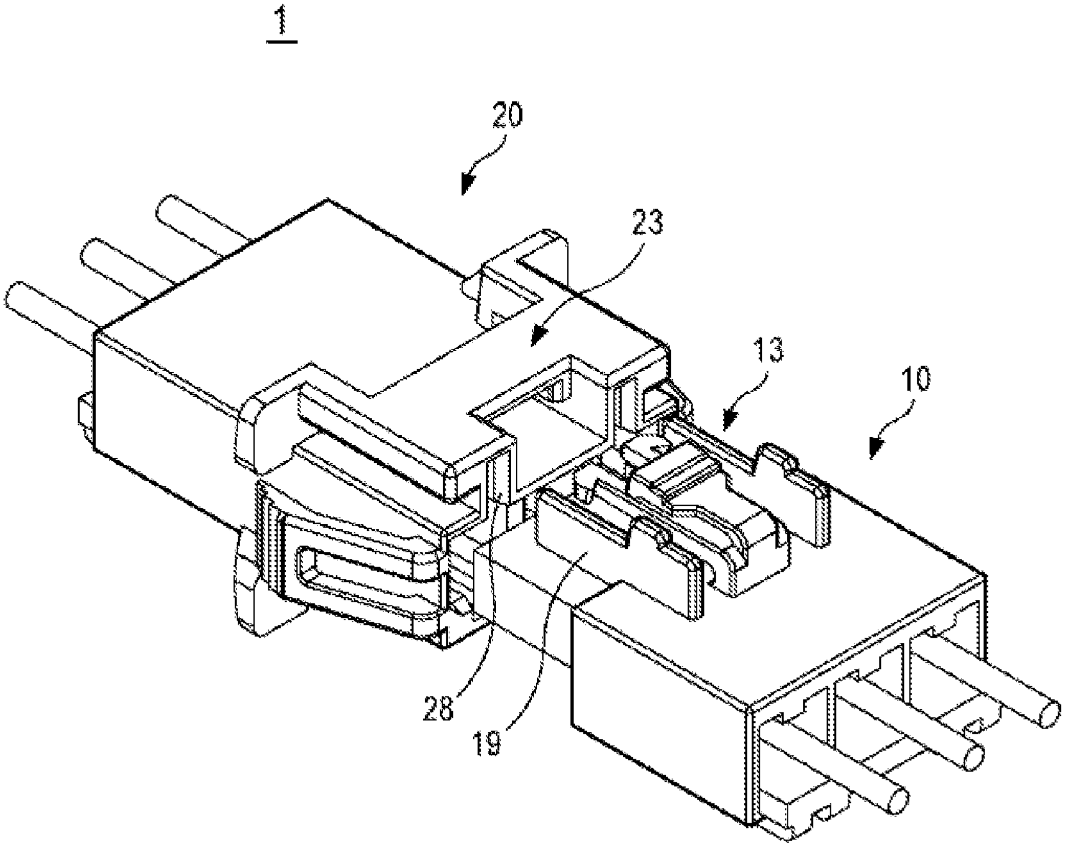
FIG. 1 is a perspective view of an electrical connector assembly according to one embodiment.

Embodiments of the present disclosure are illustrated for the purpose of explaining the technical idea of the present disclosure. The scope of rights according to the present disclosure is not limited to the embodiments presented below or the specific description of these embodiments.

All technical terms and scientific terms used in this disclosure, unless otherwise defined, have meanings commonly understood by those skilled in the art pertaining to the present disclosure. All terms used in this disclosure are selected for the purpose of more clearly explaining this disclosure and are not selected to limit the scope of rights according to this disclosure.

Expressions such as "including," "equipped with," "having," etc. used in this disclosure, unless otherwise stated in the phrase or sentence including the expression, should be understood as open-ended terms that imply the possibility of including other embodiments.

Singular terms used in this disclosure may include plural terms unless otherwise stated, and this also applies to singular terms used in the claims.

Expressions such as "first" and "second" used in the present disclosure are used to distinguish a plurality of components from each other and do not limit the order or importance of the components.

In this disclosure, when a component is referred to as being "connected" or "attached" to another component, it should be understood that any of the components can be connected or attached directly to the other components, or that they can be connected or attached through new other components.

In this disclosure, when one of the two connectors approaches the other in a straight line so that an electrical terminal held in the housing of one connector and another electrical terminal held in the housing of another connector and corresponding to that electrical terminal engage with each other, "connector matching direction" includes the direction in which one of these two connectors moves.

Additionally, when one of the two connectors approaches the other in a straight line so that an electrical terminal held in the housing of one connector and another electrical terminal held in the housing of another connector and corresponding to that electrical terminal engage with each other, "connector matching position" used in this disclosure includes the position occupied by one of these two connectors.

Hereinafter, embodiments of the present disclosure will be described with reference to the attached drawings. In the accompanying drawings, identical or corresponding components are given the same reference numerals. Additionally, in the description of the following embodiments, overlapping descriptions of identical or corresponding components may be omitted. However, even if descriptions of components are omitted, it is not intended for such components to not be included in any embodiment.

FIG. 1 is a perspective view of an electrical connector assembly 1 according to one embodiment. Referring to FIG. 1, electrical connector assembly 1 may include a plug connector 10 and a receptacle connector 20 that mates with plug connector 10. The electrical connector assembly 1 can be used for electrical connections between boards, between boards and cables, or between cables. For example, the plug connector 10 may be provided at one end of a cable, and the receptacle connector 20 may be provided at one end of another cable to be electrically connected to the cable or on a board. Hereinafter, a locking mechanism for preventing separation of the plug connector 10 and the receptacle connector 20 constituting the electrical connector assembly 1 will be described. Further, the structure of the electrical connector assembly 1 shown in the drawings of the present disclosure is an example in which the locking mechanism of the present disclosure is implemented, and does not limit the embodiments of the present disclosure.

Figure 2:
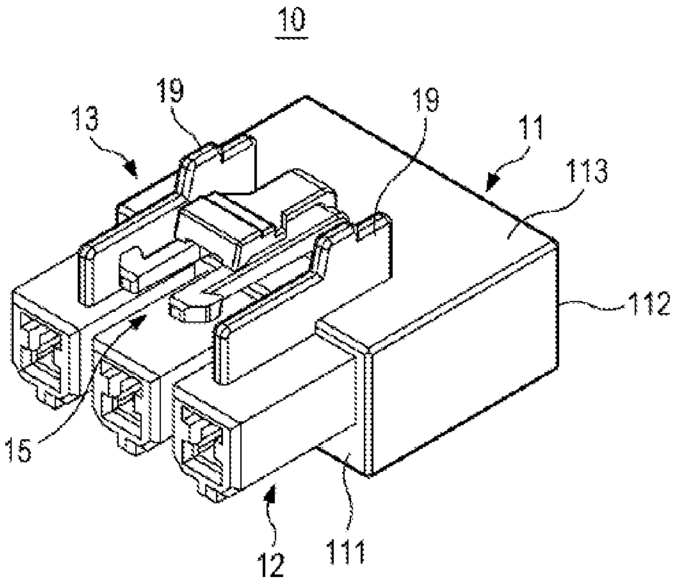
FIG. 2 is a perspective view of a plug connector according to one embodiment.
Figure 3:
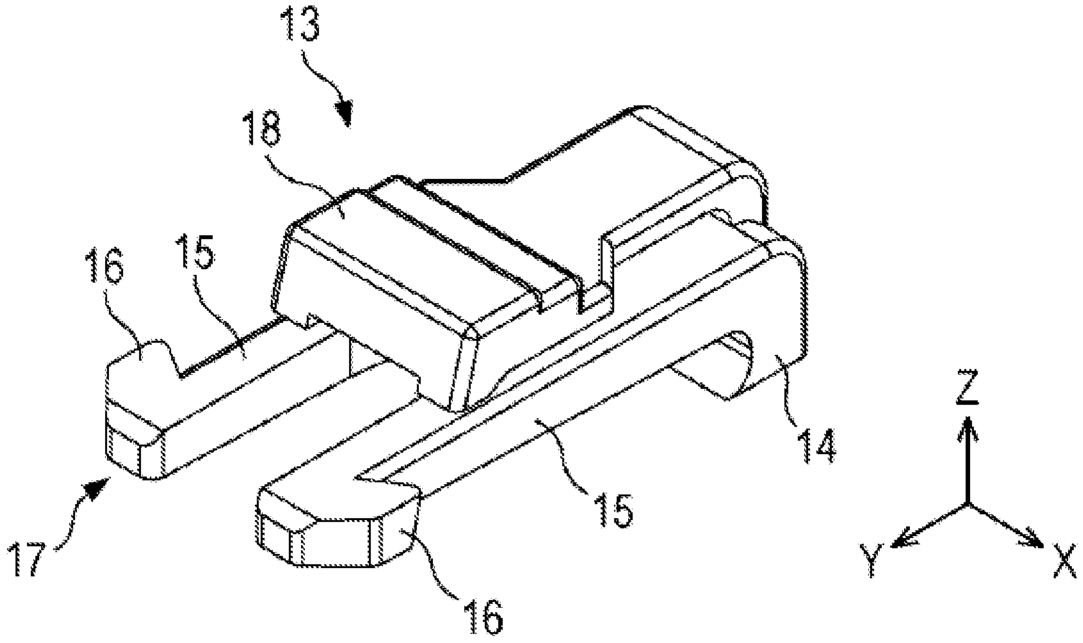
FIG. 3 is a perspective view of the latching portion of the plug connector.
Figure 4:
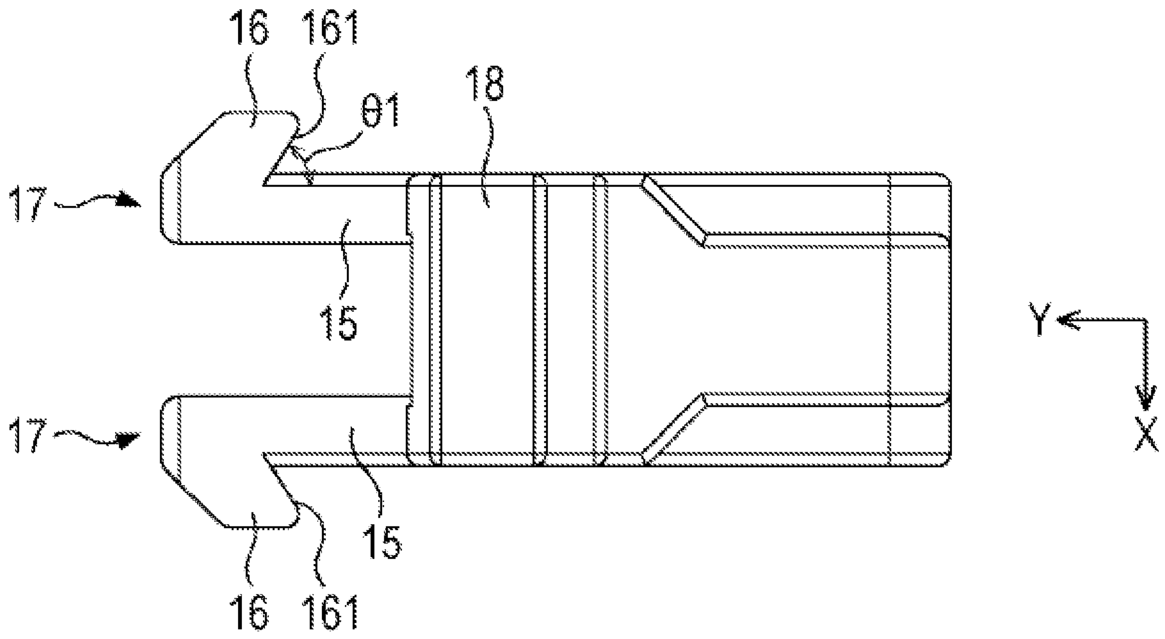
FIG. 4 is a top view of the latching portion of the plug connector.
Figure 5:
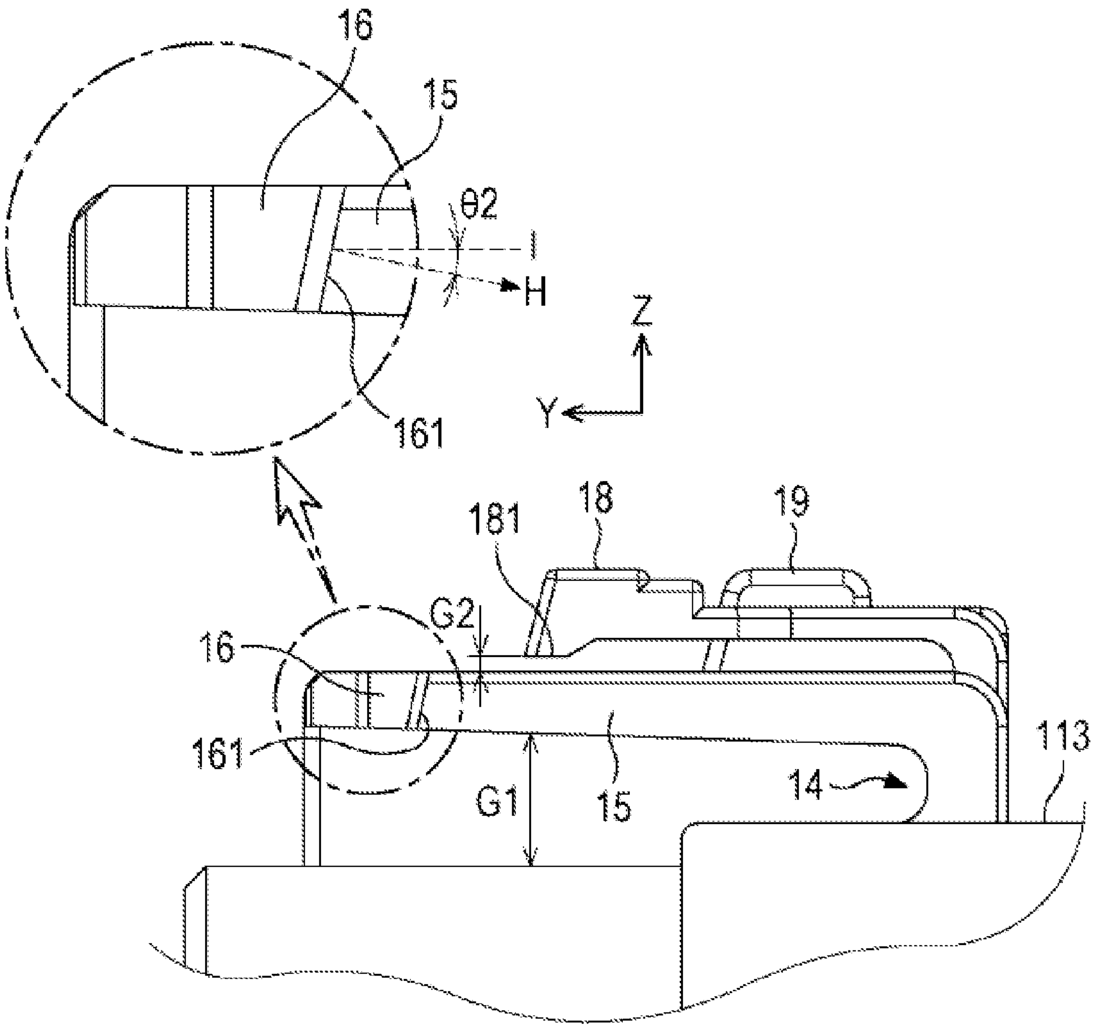
FIG. 5 is a side view of the latching portion of the plug connector.
Figure 6:
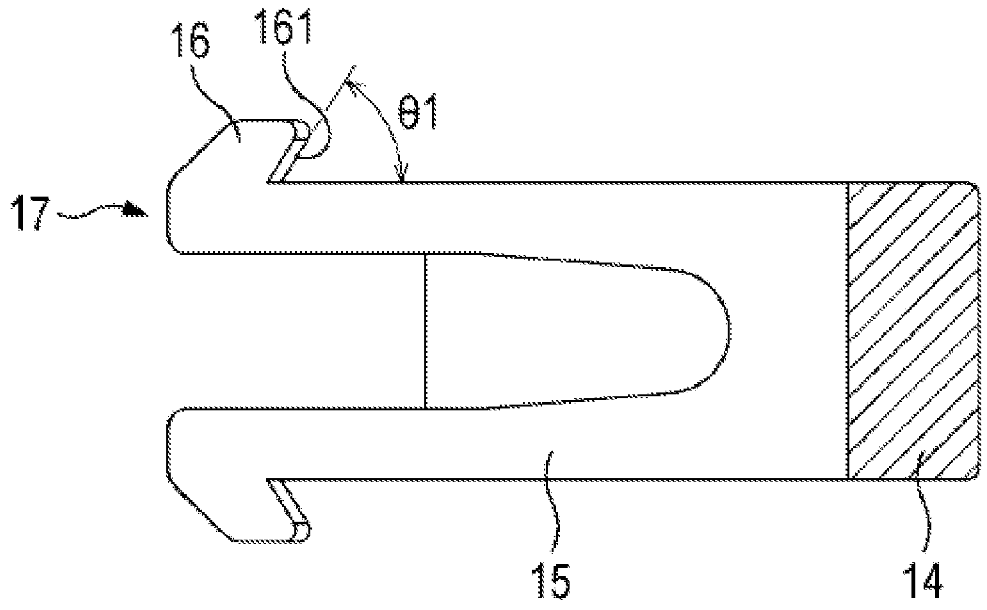
FIG. 6 is a bottom view of the latching portion of the plug connector.

FIG. 2 is a perspective view of the plug connector 10 according to one embodiment. FIG. 3 is a perspective view of the latching portion 13 of the plug connector 10. FIG. 4 is a top view of the latching portion 13 of the plug connector 10. FIG. 5 is a side view of the latching portion 13 of the plug connector 10. FIG. 6 is a bottom view of the latching portion 13 of the plug connector 10.

Referring to FIG. 2, housing 11 of plug connector 10 may include a front end 111, a rear end 112, and an upper surface 113. The housing 11 of the plug connector 10 may include a mating portion 12 extending forward and a latching portion 13 equipped in the housing 11. The latching portion 13 may be equipped on the upper surface 113 of the housing and may extend to the top of the mating portion 12. The latching portion 13 can be coupled to a receiving portion 23 provided at a corresponding position of the receptacle connector. Mating portion 12 may extend forward from front end 111 of housing 11. In the present disclosure, the front of the plug connector 10 refers to a direction toward the receptacle connector 20 when the plug connector 10 is coupled to the receptacle connector 20, and the rear of the plug connector 10 refers to the opposite direction.

The electrical connector assembly 1 includes a locking mechanism that prevents the plug connector 10 and the receptacle connector 20 from being separated from each other by unintentional external forces (e.g., shock, vibration, etc.). The plug connector 10 may include a latching portion 13 as a locking mechanism. The latching portion 13 may be equipped on the upper surface 113 of the housing 11. The latching portion 13 includes a root 14 connected to the upper surface 113 of the housing 11 and a pair of latching arms 15 extending forward from the upper end of the root 14.

The root 14 extends upward (in the Z-axis direction) from the lower end connected to the upper surface 113 of the housing 11. The root 14 forms a cantilever structure with the lower end as the first fulcrum. For example, referring to FIGS. 3 and 5, the root 14 may extend in the Z-axis direction from the lower end to the upper end.

The latching portion 13 includes a pair of latching arms 15 extending forward from the upper end of the root 14. The rear ends of the pair of latching arms 15 are connected to the upper end of the root 14. The pair of latching arms 15 may extend forward using the upper end of the root 14 as a second fulcrum to form a pair of hooks 17. For example, referring to FIGS. 4 to 6, the latching arm 15 may extend from the top of the root 14 in the Y-axis direction. A pair of hooks 17 may be formed on the front end of the latching arms 15.

Figure 13:
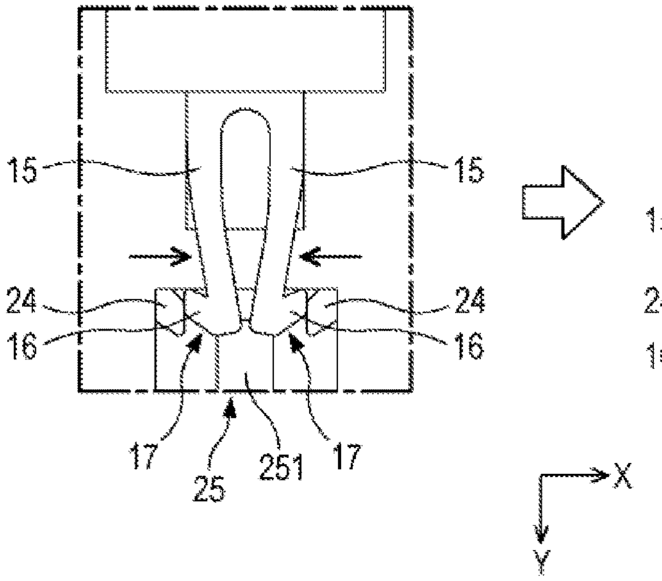
FIGS. 13 and 14 show the intermediate process in which the latching portion is inserted into the receiving portion.
Figure 14:
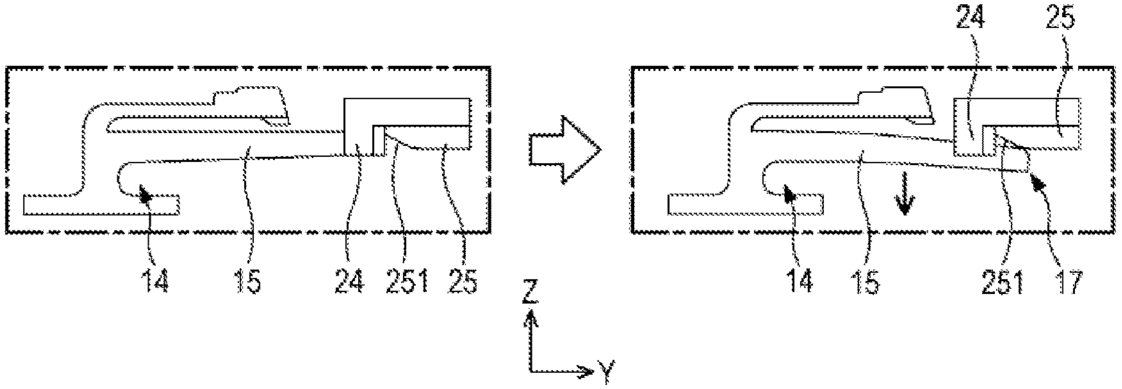

Referring to FIGS. 13 and 14, in the process of being inserted into the receptacle connector 20, the pair of latching arms 15 are deformed in the X-axis direction and also in the Z-axis direction. Specifically, as the plug connector 10 begins to mate with the receptacle connector 20, the pair of latching arms 15 contact the pair of limiting blocks 24, and the pair of latching arms 15 are bent in a direction in which the pair of hooks 17 approach each other (that is, in the X-axis direction). At this time, the upper end of the root 14 (that is, the second fulcrum or the rear end of the latching arm 15) supports the bending of the pair of hooks 17. As the plug connector 10 is further inserted into mating with the receptacle connector 20, the front end of the latching arms 15 comes into contact with the inclined surface 251. As the plug connector 10 is further inserted for mating with the receptacle connector 20, the pair of hooks 17 may be bent to approach each other and simultaneously bent downward in the height direction of the inclined surface 251 along the inclined surface 251. As the pair of latching arms 15 are deformed in the Z-axis direction, the root 14 extending upward from one end (that is, the first fulcrum) of the upper surface 113 of the housing 11 is also bent to prevent stress from being concentrated on the rear end of the latching arms 15. As described above, when the latching arms 15 are deformed in the Z-axis direction, the root 14 is also deformed, so the structural strength of the latching portion 13 can be increased. In addition, the fulcrum (second fulcrum) for deformation in the X-axis direction and the fulcrum (first fulcrum) for deformation in the Z-axis direction of the latching arms 15 are spaced apart from each other, so that the stress resulting from the two deformations is prevented from concentrating in one place, thereby preventing the latching arm 15 from being damaged by stress. However, the present disclosure is not limited to the embodiment including the root 14 extending upward.

Referring to FIG. 5, a first gap G1 may be provided between the upper surface 113 of the housing 11 and the lower surface of the pair of latching arms 15. Referring to FIG. 14 together, at the time the plug connector 10 is connected to the receptacle connector 20, as the pair of latching arms 15 enter the receiving portion 23 of the receptacle connector 20, they are deformed downward (in the arrow direction or −Z axis direction in FIG. 14). The first gap G1 between the housing 11 and the pair of latching arms 15 allows the pair of latching arms 15 to be freely deformed downward.

A pair of hooks 17 are formed in front of the pair of latching arms 15. The hooks 17 may be defined in part by a pair of outer protrusions 16 provided on the front end of the pair of latching arms 15. The outer protrusions 16 protrude outward in a direction intersecting the extension direction of the latching arms 15. For example, referring to FIG. 4, the pair of latching arms 15 may extend in the Y-axis direction, and the outer protrusions 16 may protrude outward in the X-axis direction from the end of the pair of latching arms 15 in the Y-axis direction.

Figure 9:
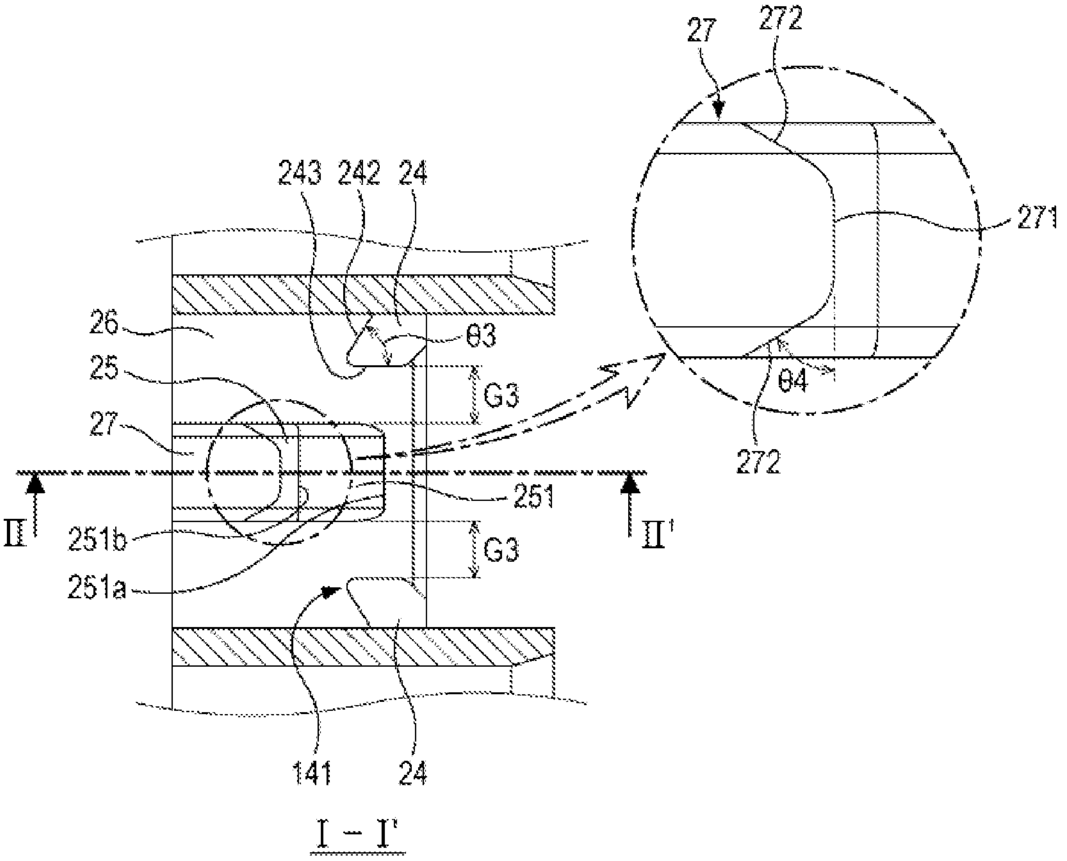
FIG. 9 is a cross-sectional view taken along line II' of FIG. 7.
Figure 12:
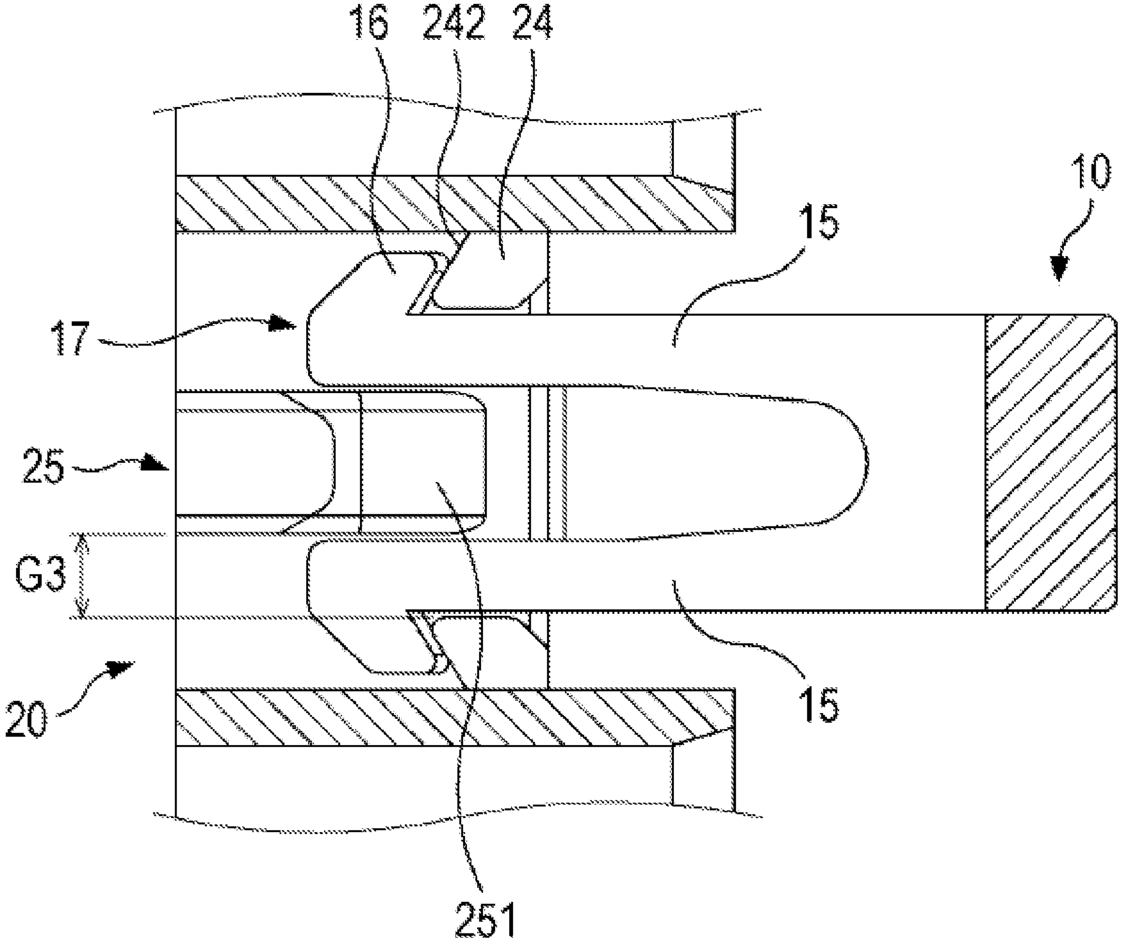
FIG. 12 shows a state in which the latching portion is inserted into the receiving portion.

The hook 17 may be provided in a wedge shape. Referring to FIGS. 4 and 6, the outer protrusions 16 are defined in part by a rearwardly facing engaging surface 161 of the latching arm 15; the angle θ1 formed between the engaging surface 161 and the latching arms 15 may be 90 degrees or an acute angle. Referring to FIG. 9 together, the angle θ1 formed between the engaging surface 161 of the plug connector 10 and the latching arms 15 may be the same or approximately equal to the angle θ3 formed between the limiting surface 242 and the inner surface 243 of the limiting blocks 24 of the receptacle connector 20. Referring to FIG. 12 together, as the angle θ1 formed by the engaging surface 161 and the latching arm 15 is provided as 90 degrees or an acute angle, it may become more difficult for the hook 17 to escape from the limiting blocks 24 in the horizontal direction (that is, in the extension direction of the latching arm 15 or in the Y-axis direction). However, in another embodiment, the angle θ1 formed between the engaging surface 161 and the latching arm 15 may be an obtuse angle.

The outer protrusions 16 may include a engaging surface 161 that is inclined in the thickness direction (that is, Z direction). Referring to FIGS. 5 and 6, the angle θ2 formed by the normal line H of the engaging surface 161 of the outer protrusions 16 clockwise from the horizontal imaginary line 1 may be greater than 0. That is, assuming that the latching arms 15 are disposed on the upper surface 113 of the housing 11, the engaging surface 161 of the outer protrusions 16 may be inclined downward. The inclination of the engaging surface 161 as described above contributes to preventing the outer protrusions 16 from deviating from the limiting blocks 24 of the receptacle connector 20, which will be described later. Referring to FIG. 12 together, when the latching portion 13 of the plug connector 10 is about to be pulled out from the receiving portion 23 of the receptacle connector 20 by an unintended external force, the central block 25 of the receiving portion 23 prevents the gap between the pair of hooks 17 from narrowing, thereby strengthening the locking between the plug connector 10 and the receptacle connector 20. However, after the hooks 17 are removed from the limiting blocks 24 in the height direction, the pair of hooks 17 can be retracted relatively easily. That is, in order to further increase the effect of the locking mechanism by the action between the pair of hooks 17 and the central block 25 described above, the engaging surface 161 of the outer protrusions 16 can be formed to be inclined downward. Accordingly, it is possible to prevent or suppress the hook 17 from falling out of the limiting blocks 24 in the height direction (that is, in the Z-axis direction), and the retracting of the hook 17 can be inhibited by the central block 25 as intended by the locking mechanism. However, the embodiments of the present disclosure are not limited to the fact that the engaging surface 161 of the outer protrusions 16 is inclined downward; in another embodiment, the engaging surface 161 of the outer protrusions 16 may have a normal vector in the horizontal direction (that is, $\theta 2=0$).

The latching portion 13 may further include an unlocking lever 18. The unlocking lever 18 is a force applying elastic arm, and is an actuating protrusion provided on the top of the latching arms 15. The unlock lever 18 may extend upwardly from the upper surface 113 of the housing 11 and then horizontally forward.

Referring to FIGS. 3 to 5, the unlocking lever 18 is a structure that extends in the Z-axis direction from the rear end of the latching arms 15 or the upper end of the root 14 and is then curved to extend in the Y-axis direction, and it may be disposed on the upper side of the pair of latching arms 15. The rear end of the unlocking lever 18 may be connected to the rear end of the latching arms 15 or the upper end of the root 14. The unlocking lever 18 extends forward from the rear end of the latching arms 15 and may be partially disposed on top of the latching arms 15. A protrusion 181 protruding toward the pair of latching arms 15 may be formed at the front end of the unlocking lever 18.

Figure 15:
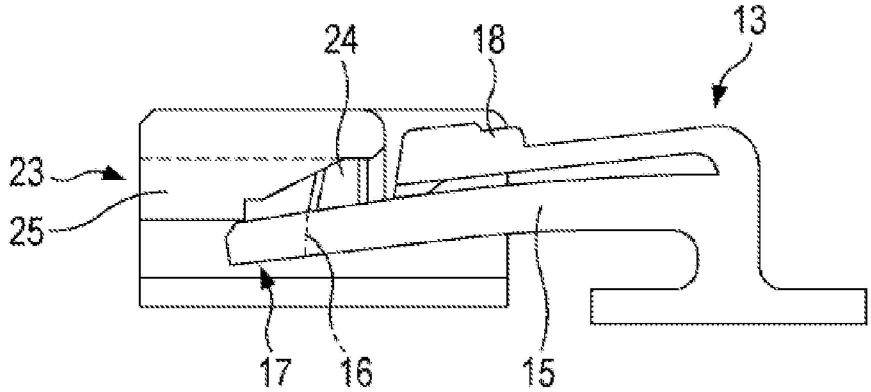
FIG. 15 shows the operation of the unlocking lever of the latching portion.

A second gap G2 may be provided between the unlocking lever 18 and the pair of latching arms 15. When an external force is applied to press the unlocking lever 18 downward (or toward the latching arms 15), the unlocking lever 18 is modified so that the front protrusion 181 of the unlocking lever 18 presses the latching arms 15 downward. Referring to FIG. 15 together, as the latching arms 15 are pressed downward, the hook 17 provided in the front of the latching arms 15 may come out of the limiting blocks 24 of the receptacle connector 20. After that, when the plug connector 10 is retracted from the receptacle connector 20, the plug connector 10 and the receptacle connector 20 may be separated from each other without the limiting blocks 24 further impeding the retraction of the hook 17.

Figure 7:
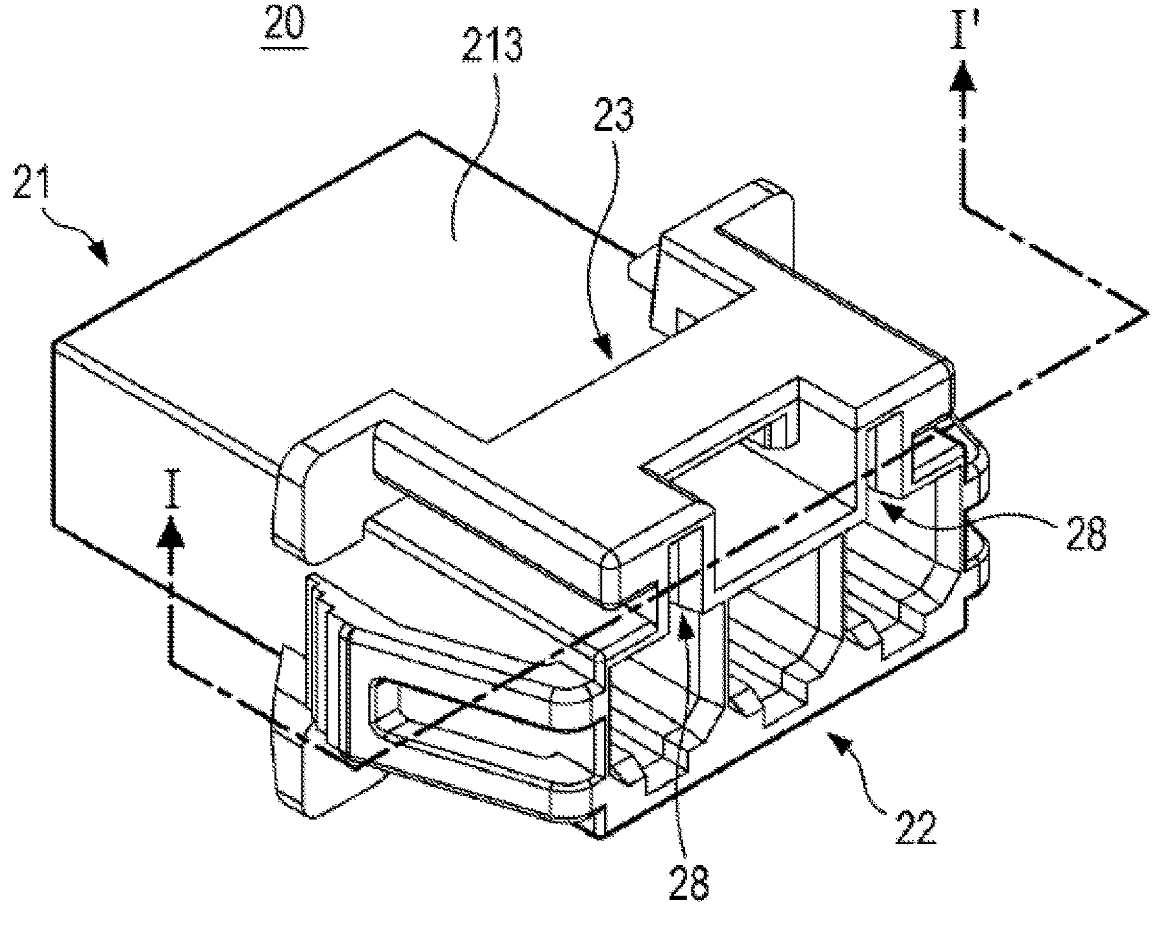
FIG. 7 is a perspective view of a receptacle connector according to one embodiment.
Figure 8:
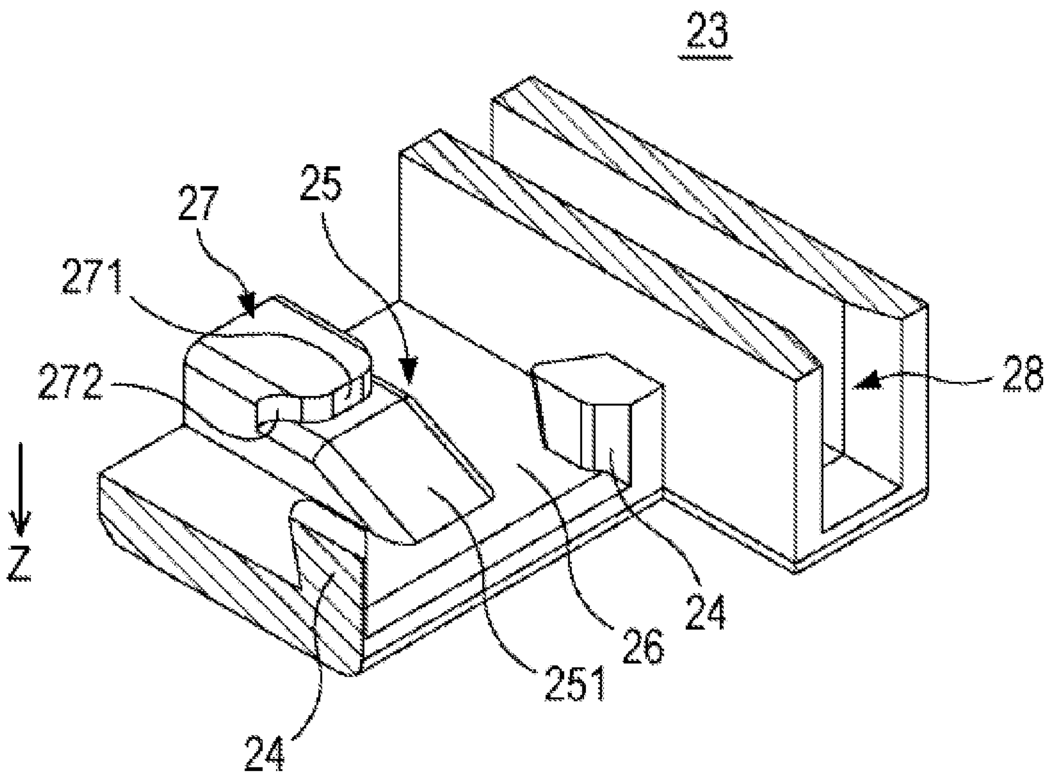
FIG. 8 is a perspective view of a receiving portion of a receptacle connector.

Referring to FIGS. 1, 2 and 5, the latching portion 13 may further include a pair of side barriers 19 which are formed by walls. A pair of side barriers 19 may be positioned on the outer sides of the pair of latching arms 15. Referring to FIGS. 7 and 8 together, the side barriers 19 may be fitted into the groove portion 28 provided in the receptacle connector 20. The groove portion 28 may protrude further toward the plug connector 10 than the receiving portion 23 that engages the latching arms 15 and the hook 17. Therefore, before the latching arms 15 and hook 17 are inserted into the receiving portion 23 of the receptacle connector 20, the side barrier 19 may first be inserted into the groove portion 28 of the receptacle connector 20. As the side barrier 19 is inserted into the groove portion 28, the latching portion 13 of the plug connector 10 and the receiving portion 23 of the receptacle connector 20 may be aligned with each other. That is, the alignment between the latching portion 13 and the receiving portion 23 can be achieved more accurately due to the interlocking between the side barrier 19 and the groove portion 28. However, embodiments of the present disclosure are not limited to the plug connector 10 including a pair of side barriers 19. In other embodiments the at least one side barrier 19 of the plug connector 10 and the at least one groove portion 28 of the receptacle connector 20 may be omitted.

Referring to FIG. 5, when viewed from the X-axis direction, the side barrier 19 may obscure at least a portion of the space defined by the first gap G1 between the latching arms 15 and the upper surface 113 of the housing 11. That is, referring to FIG. 17, a pair of side barriers 19 are disposed on both left and right sides of the latching arms 15 and can cover at least a portion of the space formed by the first gap G1 when viewed in the X-axis direction. When viewed in the X-axis direction, a pair of side barriers 19 may face each other through the space formed by the first gap G1.

Figure 10:
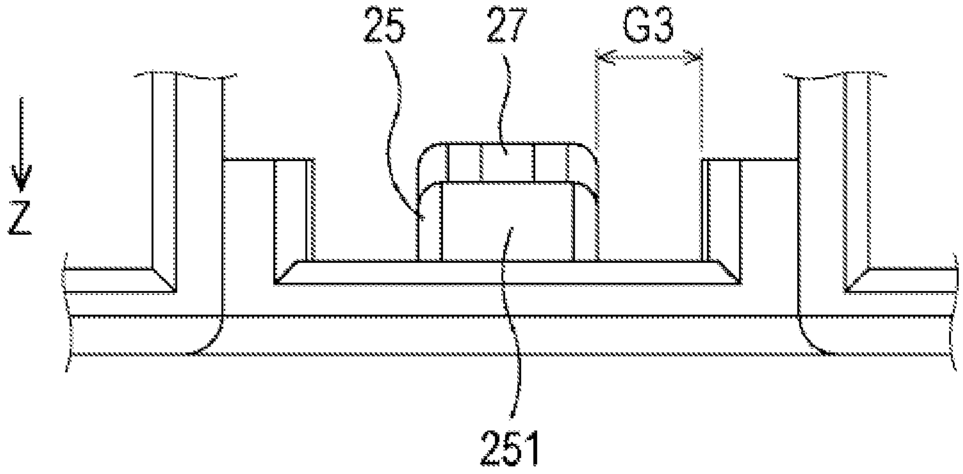
FIG. 10 is a front view of the receiving portion of the receptacle connector.
Figure 11:
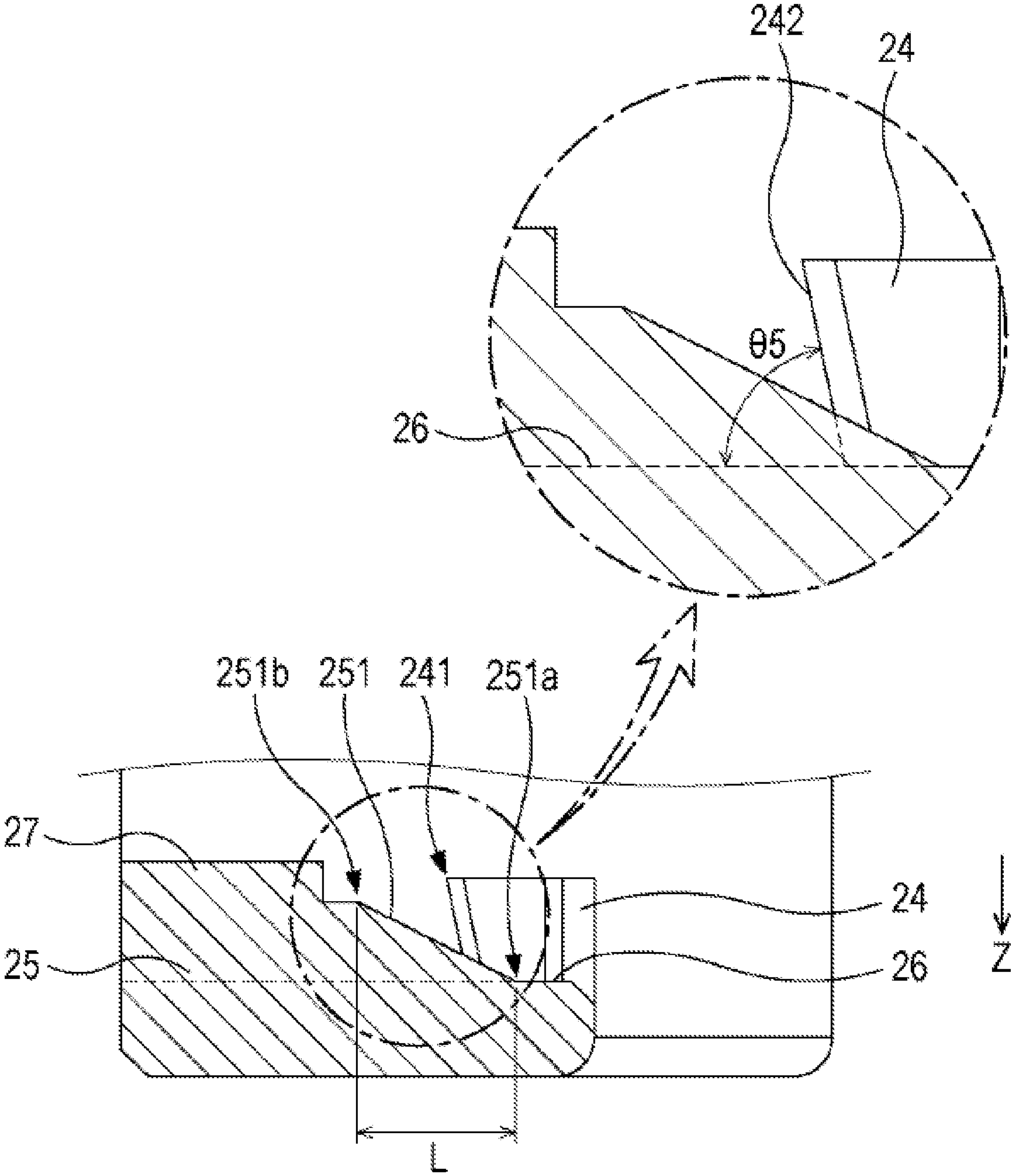
FIG. 11 is a cross-sectional view taken along line II-II' of FIG. 9.

FIG. 7 is a perspective view of the receptacle connector 20 according to one embodiment. FIG. 8 is a perspective view of the receiving portion 23 of the receptacle connector 20. FIG. 9 is a cross-sectional view taken along line II' of FIG. 7. FIG. 10 is a front view of the receiving portion 23 of the receptacle connector 20. FIG. 11 is a cross-sectional view taken along line II-II' of FIG. 9.

Referring to FIG. 7, housing 21 of receptacle connector 20 may include a front end, a rear end, and a top surface 213. The housing 21 may include a mating portion 22 extending forward and a receiving portion 23 provided in the housing 21. The receiving portion 23 may be equipped on the top surface 213 of the housing 21 and may be coupled to a latching portion 13 equipped at a corresponding position of the plug connector 10. For example, mating portion 22 may extend forward from the front end of housing 21. In the present disclosure, the front of the receptacle connector 20 refers to a direction toward the plug connector 10 when the receptacle connector 20 is coupled to the plug connector 10, and the rear of the receptacle connector 20 refers to the opposite direction.

The electrical connector assembly 1 includes a locking mechanism that prevents the plug connector 10 and the receptacle connector 20 from being separated from each other by unintentional external forces (that is, shock, vibration, etc.). The receptacle connector 20 may include a receiving portion 23 as a locking mechanism. For example, the receiving portion 23 may be provided on top of the mating portion 22.

The receiving portion 23 includes a pair of limiting blocks 24 provided at the front end of the receiving portion 23. The receiving portion 23 may include a central block 25 extending longitudinally from the rear end of the receiving portion 23 toward the front end. A pair of limiting blocks 24 and a central block 25 protrude from the seating surface 26 in the height direction.

Referring to FIGS. 9, 10, and 12, a third gap G3 may be provided between the central block 25 and the pair of limiting blocks 24, respectively. The third gap G3 may be set so that the latching arms 15 of the plug connector 10 can be positioned at the third gap G3.

The receiving portion 23 may include a seating surface 26 between the front end of the receiving portion 23 and the pair of limiting blocks 24. Referring to FIGS. 9 and 12, the seating surface 26 refers to a surface that faces the pair of latching arms 15 in the vertical direction when the pair of latching arms 15 are aligned with the receiving portion 23.

The central block 25 includes an inclined surface 251 at its front end, and the inclined surface 251 can be gradually raised from the seating surface 26 toward the rear end of the receiving portion 23. Referring to FIGS. 13 and 14 together, ss the pair of latching arms 15 enters the pair of limiting blocks 24 in the Y-axis direction, the gap between the pair of hooks 17 decreases. When the pair of latching arms 15 further enters, the pair of hooks 17 may descend in the Z-axis direction along the inclined surface 251 of the central block 25. For example, in the process of aligning the latching arms 15 with the receiving portion 23 in the Y-axis direction, a pair of hooks 17 is able to move in the Z-axis direction along the inclined surface 251 while getting closer to each other in the X-axis direction.

The central block 25 may extend between a pair of limiting blocks 24. The rear end 241 of the pair of limiting blocks 24 may be located between the front end 251*a* of the inclined surface 251 and the rear end 251*b* of the inclined surface 251. For example, referring to FIGS. 9 and 11, the central block 25 may include an inclined surface 251, and the rear end 241 of the limiting blocks 24 may be located in the section L between the low point (or front end 251*a*) and the high point (or rear end 251*b*) of the inclined surface 251. Referring to FIGS. 13 and 14, due to this structure, the pair of hooks 17 can be retracted in the X-axis direction by the limiting blocks 24 and move in the Z-axis direction along the inclined surface 251 of the central block 25.

Each of the pair of limiting blocks 24 includes a limiting surface 242 at the rear end of the limiting blocks 24 that contacts when engaged with the outer protrusions 16 of the pair of latching arms 15; the limiting surface 242 may be inclined with respect to the inner surface 243 of the limiting blocks 24. Referring to FIG. 9, the angle θ3 formed between the limiting surface 242 and the inner surface may be an acute angle or 90 degrees. Referring to FIG. 4 together, the angle θ3 formed by the limiting surface 242 and the inner surface may be the same or approximately equal to the angle θ1 formed by the engaging surface 161 and the latching arm 15. However, in another embodiment, the angle θ3 formed by the limiting surface 242 and the inner surface 243 may be an obtuse angle.

The limiting surface 242 of the limiting blocks 24 may be inclined in the thickness direction. Referring to FIG. 11, the angle θ5 formed by the limiting surface 242 and the seating surface 26 may be an acute angle. That is, the limiting surface 242 may be provided in a form inclined toward the seating surface 26. Referring to FIGS. 5 and 6 together, the angle θ5 formed by the limiting surface 242 and the seating surface 26 may be formed to correspond to the inclination of the engaging surface 161 of the outer protrusions 16. The inclination of the limiting surface 242 as described above contributes to preventing the outer protrusions 16 of the plug connector 10 from deviating from the limiting blocks 24. Referring to FIG. 12 together, when the latching portion 13 is about to be pulled out from the receiving portion 23 of the receptacle connector 20 by an unintended external force, the gap between the pair of hooks 17 is prevented from narrowing by the central block 25 of the receiving portion 23, and accordingly, the locking between the plug connector 10 and the receptacle connector 20 becomes stronger. However, after the hooks 17 are removed from the limiting blocks 24 in the height direction, the pair of hooks 17 can be retracted relatively easily. That is, in order to further increase the effect of the locking mechanism by the action of the pair of hooks 17 and the central block 25 described above, the limiting surface 242 may be provided in a form inclined toward the seating surface 26. Accordingly, it is possible to prevent or suppress the hook 17 from falling out of the limiting blocks 24 in the height direction (that is, −Z-axis direction), and the retracting of the hook 17 can be inhibited by the central block 25 as intended by the locking mechanism. However, the embodiment of the present disclosure is not limited to the limiting surface 242 being inclined toward the seating surface 26; in other embodiments, the limiting surface 242 may extend vertically from the seating surface 26 (that is, 05=90 degrees).

The receiving portion 23 may further include a guide block 27 disposed on the central block 25. Referring to FIGS. 8 and 9, the guide block 27 protrudes further upward from the central block 25. The guide block 27 may include a front face 271 facing forward and a guide surface 272 extending rearward from both sides of the front face 271. The guide surface 272 is formed to be inclined from the front face 271 toward the rear. The front ends of the pair of latching arms 15 raised along the inclined surface 251 of the central block 25 may be opened to both sides along the guide surface 272. Accordingly, the front ends of the pair of latching arms 15 can easily fall into the third gap G3 between the central block 25 and the limiting blocks 24.

FIG. 12 shows the state in which the latching portion 13 is inserted into the receiving portion 23. FIGS. 13 and 14 show the intermediate process in which the latching portion 13 is inserted into the receiving portion 23. FIG. 15 shows the operation of the unlocking lever 18 of the latching portion 13.

Referring to FIG. 12, the latching portion 13 of the plug connector 10 may be received in the receiving portion 23 of the receptacle connector 20. The pair of latching arms 15 are located in the third gap G3 formed between the central block 25 and the pair of limiting blocks 24. In this case, when the plug connector 10 retracts from the receptacle connector 20, a pair of hooks 17 (or a pair of outer protrusions 16) are caught on the limiting blocks 24. The limiting blocks 24 prevent the retraction of the latching arm 15, and at the same time, the central block 25 disposed between the pair of latching arms 15 prevents the pair of hooks 17 from approaching each other. If a strong external force acts on the latching arm 15 and the gap between the pair of hooks 17 narrows, the limiting blocks 24 may no longer be able to prevent the latching arms 15 from leaving. According to an embodiment of the present disclosure, the central block 25 can prevent the pair of hooks 17 from collapsing; this can prevent the pair of hooks 17 from falling out of the receptacle connector 20 even when a relatively large external force is applied. In other words, the electrical connector assembly 1 according to an embodiment of the present disclosure can provide a high level of locking strength without significantly increasing the insertion force required to match the plug connector 10 to the receptacle connector 20.

Referring to FIG. 13, when the plug connector 10 is inserted into the receptacle connector 20, and when the pair of hooks 17 of the latching arms 15 contact the pair of limiting blocks 24, the front ends of the latching arms 15 come into contact with the inclined surface 251. In other words, s section where the hook 17 and the limiting blocks 24 contact each other and a section where the front end of the latching arms 15 and the inclined surface 251 contact each other may at least partially overlap each other.

At the time the plug connector 10 is mated with the receptacle connector 20, as the pair of latching arms 15 contact the pair of limiting blocks 24, the pair of hooks 17 may be bent to become closer to each other. That is, referring to FIG. 13, when the plug connector 10 is inserted into the receptacle connector 20 in the Y-axis direction, the pair of hooks 17 may become closer to each other in the X-axis direction.

When the plug connector 10 is matched with the receptacle connector 20, the pair of hooks 17 may be bent to approach each other and simultaneously bent downward in the height direction of the inclined surface 251 along the inclined surface 251. That is, referring to FIG. 14, the pair of hooks 17 may approach each other in the X-axis direction and descend in the Z-axis direction along the inclined surface 251.

Referring to FIG. 12 together, at the time the plug connector 10 is mated with the receptacle connector 20, when the pair of latching arms 15 are fastened to the pair of limiting blocks 24, the pair of hooks 17 may contact the restriction surface 242.

Referring to FIGS. 13 and 14, as the plug connector 10 receives the latching portion 13 into the receiving portion 23 for mating with the receptacle connector 20, the pair of latching arms 15 are elastically bent between a pair of limiting blocks 24. That is, as the latching arms 15 advance in the Y-axis direction, the pair of hooks 17 become closer to each other in the X-axis direction. When the latching arms 15 advance further in the Y-axis direction, the pair of hooks 17 may descend in the Z-axis direction along the inclined surface 251. Afterwards, when the latching arms 15 further advance in the Y-axis direction, the latching arms 15 are restored and are disposed in the gap between the central block 25 and the pair of limiting blocks 24 (that is, the third gap G3 in FIG. 12).

In the above series of insertion processes, registration feedback may be provided that allows the user to recognize whether registration is complete. For example, after the pair of hooks 17 is retracted by the inner surface 243 of the pair of limiting blocks, when the latching arm 15 is further inserted, the pair of hooks 17 may be restored and collide with surrounding structures (for example, limiting blocks 24); the click sound generated at this time may allow the user to recognize that the matching of the plug connector 10 and the receptacle connector 20 has been completed. Or, a change in the insertion force felt by the user during the insertion process may allow the user to recognize that the matching of the plug connector 10 and the receptacle connector 20 has been completed. According to an embodiment of the present disclosure, the pair of hooks 17 is deformed and restored not only in the X-axis but also in the Z-axis direction along the inclined surface 251, thereby providing better matching feedback.

Referring to FIG. 13, the inclined surface 251 of the central block 25 has a greater width than the gap between the front ends of the pair of latching arms 15 when the pair of latching arms 15 are bent by the pair of limiting blocks 24. Accordingly, when the latching arms 15 are further inserted into the receiving portion 23, the front ends of the pair of latching arms 15 slide along the inclined surface 251.

Referring to FIG. 15, the unlocking lever 18 presses the latching arms 15 downward, which allows the hook 17 (or outer protrusions 16) of the latching arms 15 to come out of the limiting blocks 24 and the central block 25. The latching portion 13 can then be freely retracted from the receiving portion 23. That is, while the electrical connector assembly 1 according to an embodiment of the present disclosure provides a high level of locking strength, the release force required to separate the plug connector 10 from the receptacle connector 20 can be lowered.

Figure 16:
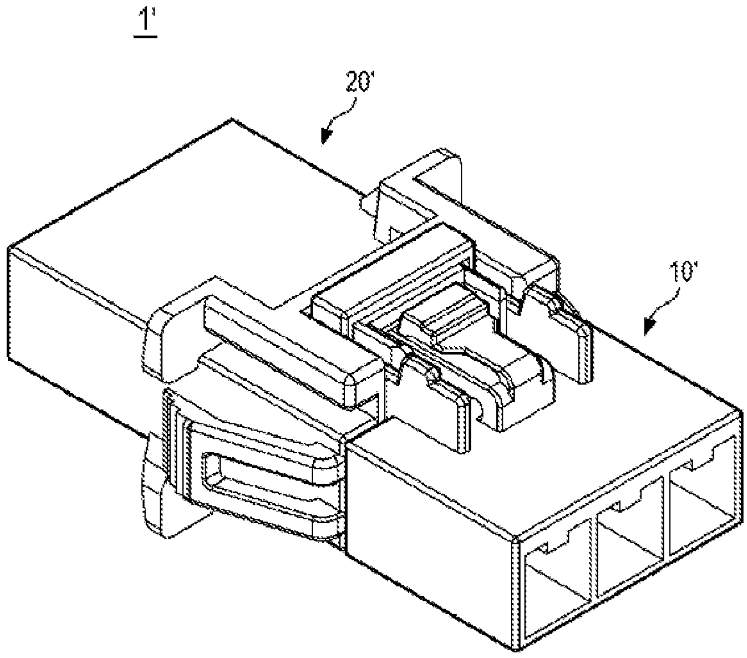
FIG. 16 is a perspective view of an electrical connector assembly according to another embodiment.
Figure 17:
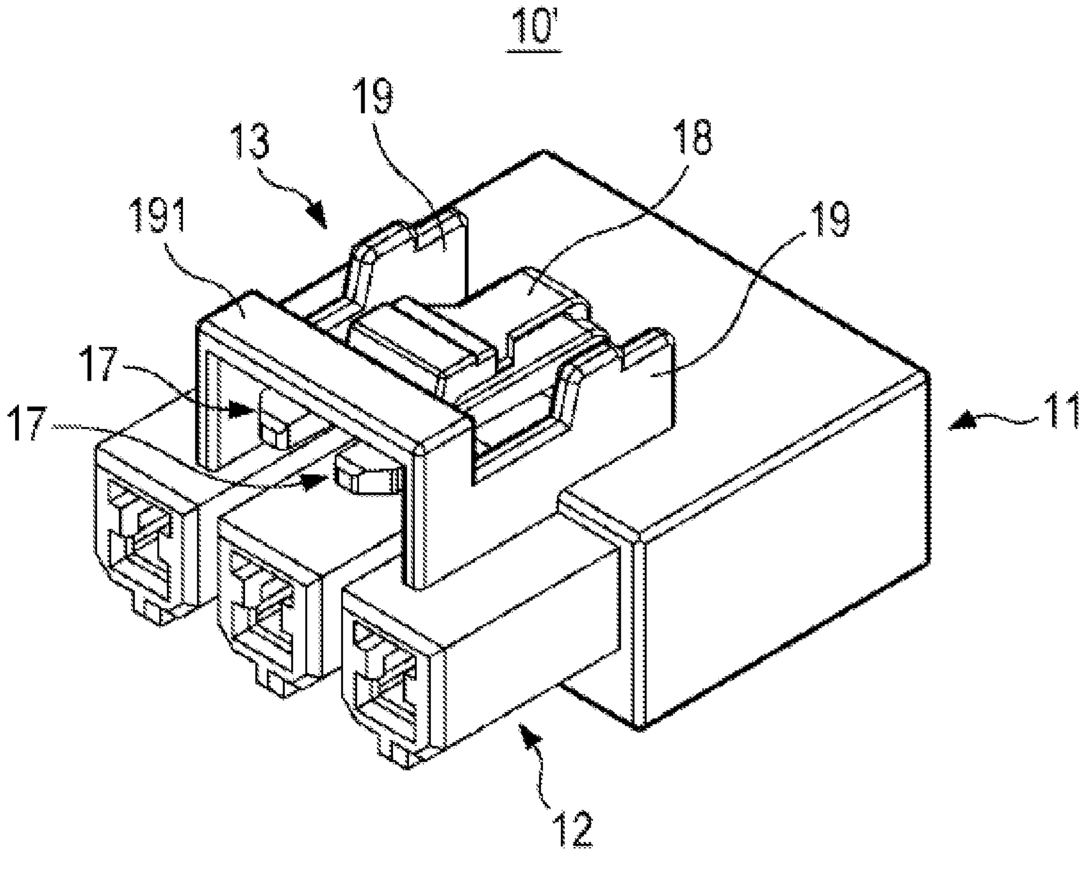
FIG. 17 is a perspective view of a plug connector of the electrical connector assembly of FIG. 16.
Figure 18:
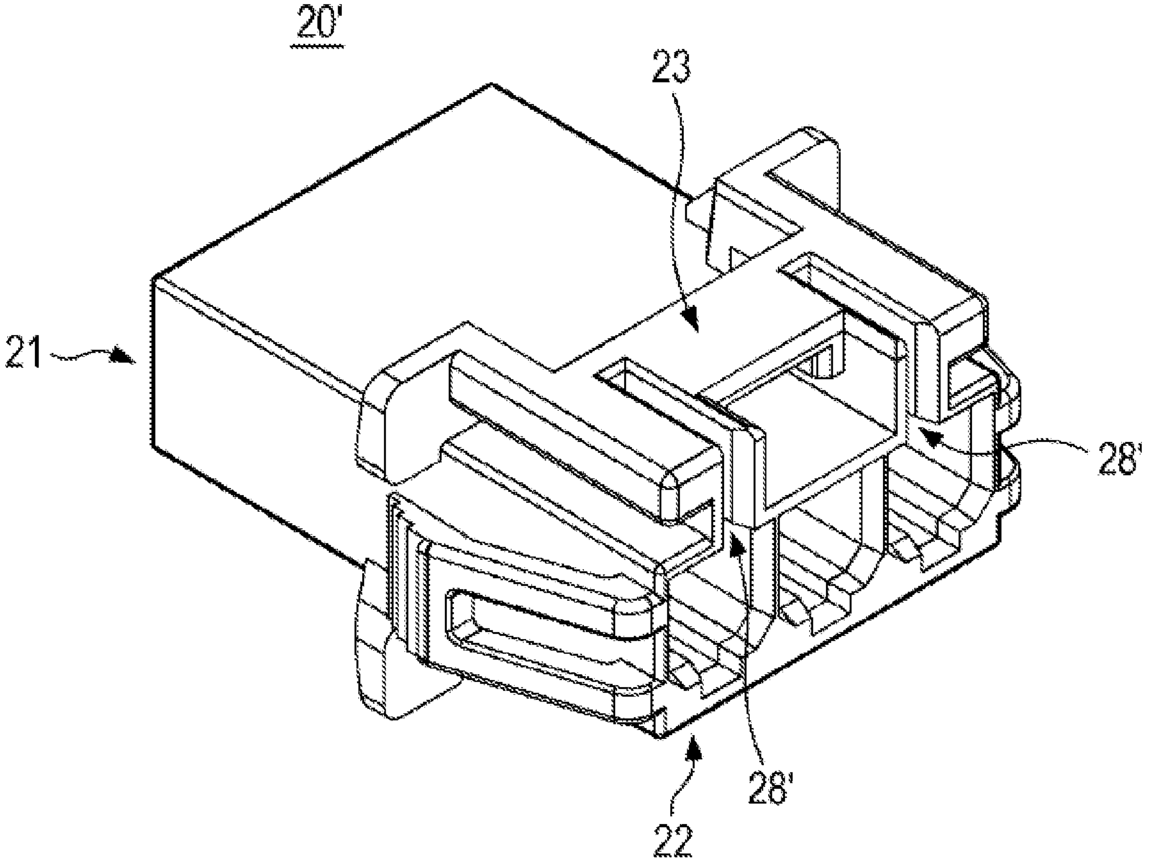
FIG. 18 is a perspective view of a receptacle connector of the electrical connector assembly of FIG. 16.

FIG. 16 is a perspective view of an electrical connector assembly 1' according to another embodiment. FIG. 17 is a perspective view of the plug connector 10' of the electrical connector assembly 1' of FIG. 16. FIG. 18 is a perspective view of the receptacle connector 20' of the electrical connector assembly 1' of FIG. 16.

With reference to FIGS. 1 to 15, the description of the electrical connector assembly 1 according to the above-described embodiment also applies to the electrical connector assembly 1' according to the embodiment described later with reference to FIGS. 16 to 18. With reference to FIGS. 16 to 18, the differences from the embodiments of FIGS. 1 to 15 will be explained as follows.

Referring to FIG. 17, the plug connector 10' may further include a hook protection portion 191 disposed on the hook 17 of the latching arm 15. The hook protection portion 191 is able to prevent the hook 17 from being damaged while transporting or using the plug connector 10'. The hook protection portion 191 extends in the horizontal direction and is disposed on the upper side of the hook 17; both ends of the hook protection portion 191 may be connected to and supported by a pair of side barriers 19.

Referring to FIG. 18, the receptacle connector 20' includes a groove portion 28' into which the side barrier 19 can be fitted. In the receptacle connector 20 of FIG. 7, the groove portion 28 for receiving the side barrier 19 is closed upward, and the groove portion 28' of the receptacle connector 20' in FIG. 18 is open upward. Accordingly, the side barrier 19 may extend higher than in FIG. 7 and be connected to both ends of the hook protection portion 191.

Meanwhile, in the present disclosure, the latching portion 13 is equipped in the plug connector 10, and a receiving portion 23 that matches the latching portion 13 is provided in the receptacle connector 20, but this is merely an example. In another embodiment, the latching portion 13 may be provided in the receptacle connector 20, and the receiving portion 23 that matches the latching portion 13 may be provided in the plug connector 10.

Although the technical idea of the present disclosure has been described above by some embodiments and examples shown in the attached drawings, it should be noted that, in the technical field pertaining to the present disclosure, various substitutions, modifications, and changes can be made without departing from the technical spirit and scope of the present disclosure that can be understood by those of ordinary skill in the art. Furthermore, such substitutions, modifications and alterations are intended to fall within the scope of the appended claims.

The invention claimed is:

1. A plug connector comprising:

a housing having a mating portion extending forward and a latching portion extending from the housing, and the latching portion including a root having a lower end connected to an upper surface of the housing a root and extending to an upper end, a pair of latching arms, each latching arm having a rear end connected to the upper end of the root, the pair of latching arms extending to a front end thereof, each front end of the pair of latching arms includes an outward protrusion thereby forming a pair of hooks, wherein the lower end of the root provides a first fulcrum, the upper end of the root provides a second fulcrum, and the latching portion forms a cantilever structure.

2. The plug connector according to claim 1,
wherein a first gap is provided between the upper surface of the housing and lower surfaces of the pair of latching arms, and
the latching portion further includes an unlocking lever, the unlocking lever being configured to engage with upper surfaces of the latching arms.

3. The plug connector according to claim 2,
wherein the unlocking lever is a force applying elastic arm,
a second gap is provided between the unlocking lever and the pair of latching arms,
a rear end of the unlocking lever is connected to the rear ends of the latching arms, and
a front end of the unlocking lever has a protrusion protruding toward the pair of latching arms.

4. The plug connector according to claim 1,
wherein the latching portion further includes a pair of side barriers provided on either side of the pair of latching arms and are arranged to obscure at least a portion of a space between the latching arms and the upper surface of the housing.

5. A receptacle connector comprising
a housing including a mating portion extending forward and a receiving portion,
the receiving portion having a front end and a rear end, a pair of limiting blocks at the front end of the receiving portion thereof, wherein a seating surface is provided between a front end of the receiving portion and the pair of limiting blocks, and a central block extending longitudinally from the rear end of the receiving portion and extending between the pair of limiting blocks, the central block including an inclined surface at a front end thereof which gradually rises from the seating surface toward the rear end of the receiving portion; and
wherein a gap is provided between the central block and each of the pair of limiting blocks.

6. The receptacle connector according to claim 5,
wherein rear ends of the pair of limiting blocks are located between a front end of the inclined surface and a rear end of the inclined surface.

7. The receptacle connector according to claim 5,
wherein each of the limiting blocks includes an inclined limiting surface at a rear end thereof, each limiting surface is inclined with respect to an inner surface of the respective limiting block.

8. The receptacle connector according to claim 5, wherein the pair of limiting blocks and the central block are configured to contact outer protrusions of a pair of latching arms of a plug connector during engagement of the plug connector and the receptacle connector.

9. The receptacle connector according to claim 8, wherein rear ends of the pair of limiting blocks are located between a front end of the inclined surface and a rear end of the inclined surface.

10. An electrical connector assembly comprising:
a plug connector including a housing having a mating portion extending forward and a latching portion extending from the housing, the latching portion including a root having a lower end connected to an upper surface of the housing and extending to an upper end, a pair of latching arms forming hooks, each latching arm having a rear end connected to the upper end of the root, the pair of latching arms extending to a front end thereof, each front end of the pair of latching arms includes an outward protrusion thereby forming a pair of hooks, wherein the lower end of the root provides a first fulcrum, the upper end of the root provides a second fulcrum, and the root and latching arms form a cantilever structure; and
a receptacle connector including a housing having a mating portion extending forward and a receiving portion, the receiving portion having a front end and a rear end, a pair of limiting blocks at the front end of the receiving portion, and a central block extending longitudinally from the rear end of the receiving portion and extending between the pair of limiting blocks, and wherein a gap is provided between the central block and each of the pair of limiting blocks.

11. The electrical connector assembly according to claim 10,
wherein the receiving portion includes a seating surface between the front end of the receiving portion and the pair of limiting blocks, and
the central block includes an inclined surface at a front end thereof which gradually rises from the seating surface toward the rear end of the receiving portion; and
wherein when the latching portion is received into the receiving portion for mating the plug connector with the receptacle connector, the pair of latching arms are bent between the pair of limiting blocks, and front ends of the pair of latching arms are slidably moved along the inclined surface.

12. The electrical connector assembly according to claim 11,
wherein when the plug connector mates with the receptacle connector, the pair of latching arms are respectively positioned in the gaps between the central block and the pair of limiting blocks.

13. The electrical connector assembly according to claim 11,
wherein the inclined surface has a width greater than a gap between front ends of the pair of latching arms when the pair of latching arms are bent between the pair of limiting blocks.

14. The electrical connector assembly according to claim 11,
wherein when the plug connector is mated with the receptacle connector, the pair of hooks respectively contact the pair of limiting blocks, and front ends of the pair of latching arms respectively contact the inclined surface.

15. The electrical connector assembly according to claim 11,
wherein when the plug connector is mated with the receptacle connector, the pair of hooks are bent to approach each other as the pair of latching arms contact the pair of limiting blocks.

16. The electrical connector assembly according to claim 11,
wherein when the plug connector is mated with the receptacle connector, the pair of latching arms are bent so that the pair of hooks are close to each other and move along the inclined surface in a height direction of the inclined surface.

17. The electrical connector assembly according to claim 11, wherein each of the limiting blocks includes an inclined limiting surface at a rear end thereof which respectively contacts an outer protrusion on each of the pair of latching arms when engaged.

18. A receptacle connector comprising a housing including a mating portion extending forward and a receiving portion, the receiving portion having a front end and a rear end, a pair of limiting blocks at the front end of the receiving portion thereof, and a central block extending longitudinally from the rear end of the receiving portion and extending between the pair of limiting blocks, each of the limiting blocks includes an inclined limiting surface at a rear end of the limiting blocks which is configured to respectively contact an outer protrusion of a pair of latching arms of a plug connector when engaged, each limiting surface is inclined with respect to an inner surface of the respective limiting block; and wherein a gap is provided between the central block and each of the pair of limiting blocks.

* * * * *